United States Patent
Tsay et al.

(10) Patent No.: US 8,810,174 B2
(45) Date of Patent: Aug. 19, 2014

(54) GENERATING A COIL SWITCHING SIGNAL FOR A BRUSHLESS DC MOTOR

(75) Inventors: Ching-Yuh Tsay, Plano, TX (US); Chuan Hung Chi, Daijia Township (TW)

(73) Assignee: Diodes Incorporated, Plano, TX (US)

( * ) Notice: Subject to any disclaimer, the term of this patent is extended or adjusted under 35 U.S.C. 154(b) by 220 days.

(21) Appl. No.: 13/341,192

(22) Filed: Dec. 30, 2011

(65) Prior Publication Data

US 2012/0169261 A1    Jul. 5, 2012

Related U.S. Application Data

(60) Provisional application No. 61/428,666, filed on Dec. 30, 2010.

(51) Int. Cl.
*H02P 6/00*       (2006.01)

(52) U.S. Cl.
CPC ........................................ *H02P 6/00* (2013.01)
USPC .................. 318/400.17; 318/400.01; 318/700

(58) Field of Classification Search
CPC ........................................................ H02P 6/00
USPC ................................ 318/400.17, 400.01, 700
See application file for complete search history.

(56) References Cited

U.S. PATENT DOCUMENTS

| 6,563,284 B2 * | 5/2003 | Teutsch et al. | 318/599 |
| 8,093,844 B2 * | 1/2012 | Milesi et al. | 318/362 |
| 8,248,019 B2 * | 8/2012 | Kawashima | 318/727 |

FOREIGN PATENT DOCUMENTS

| JP | 2003174792 | 6/2003 |
| JP | 2010252619 | 11/2010 |
| KR | 1020020022040 | 3/2002 |
| KR | 1020030012363 | 2/2003 |
| KR | 1020080114465 | 12/2008 |

* cited by examiner

*Primary Examiner* — David Luo

(57) ABSTRACT

Some embodiments provide a system that generates a coil switching signal for a brushless DC motor. During operation, the system determines a magnetic field of the brushless DC motor at a first time and a magnetic field of the brushless DC motor at a second time. Then, the coil switching signal is generated based on a relationship between the magnetic field determined at the first time and a first predetermined threshold, and the magnetic field determined at the second time and a second predetermined threshold.

20 Claims, 2 Drawing Sheets

GENERATING A COIL SWITCHING SIGNAL FOR A BRUSHLESS DC MOTOR

RELATED APPLICATION

This application hereby claims priority under 35 U.S.C. §119 to U.S. Provisional Application No. 61/428,666, entitled "Tail End Current Reduction Circuits for a Motor Driver," by Ching-Yuh Tsay, and Chuan Hung Chi, filed 30 Dec. 2010, which is hereby incorporated by reference.

BACKGROUND

1. Field

The present embodiments relate to techniques for controlling a brushless DC motor. More specifically, the present embodiments relate to techniques for generating a coil switching signal for a brushless DC motor.

2. Related Art

Typically, in order to drive the stator coils of a brushless DC motor, the magnitude and polarity of the magnetic field of the rotor is detected with a sensor. As the rotor rotates, the magnetic field of the rotor at a stator coil switches polarity. The sensor detects this polarity switch and a motor controller then generates a signal to reverse the polarity of the magnetic field generated by the stator coil. However, for some motor controllers, the threshold magnetic field at which the motor controller generates the signal to reverse the direction of the stator coil current is set so that the coil current switches only after the polarity of the magnetic field of the rotor has switched. Then, for the portion of the cycle in which the polarity of the magnetic field of the coil is the same as the polarity of the magnetic field of the rotor, the motor will act like a generator and back emf may cause the tail end of the coil driver current to peak. This peaking of the driver current may cause undesirable noise, and may decrease the efficiency of the motor.

Hence, use of brushless DC motors may be facilitated by improved techniques for generating a coil switching signal.

SUMMARY

Some embodiments provide a system that generates a coil switching signal for a brushless DC motor. During operation, the system determines a magnetic field of the brushless DC motor at a first time and a magnetic field of the brushless DC motor at a second time. Then, the coil switching signal is generated based on a relationship between the magnetic field determined at the first time and a first predetermined threshold, and the magnetic field determined at the second time and a second predetermined threshold.

In some embodiments, a magnitude of the first predetermined threshold is larger than a magnitude of the second predetermined threshold, and a polarity of the first predetermined threshold is the same as a polarity of the second predetermined threshold.

In some embodiments, determining the magnetic field of the brushless DC motor includes determining the magnetic field at the first time using a Hall effect sensor, and determining the magnetic field at the second time using the Hall effect sensor.

In some embodiments, the relationship between the magnetic field determined at the first time and the first predetermined threshold, and the magnetic field determined at the second time and the second predetermined threshold includes a magnitude of the magnetic field determined at the first time being larger than or equal to a magnitude of the first predetermined threshold and a magnitude of the magnetic field determined at the second time being less than or equal to a magnitude of the second predetermined threshold.

In some embodiments, the coil switching signal is generated based on a reduction in a magnitude of the sensed magnetic field.

Some embodiments further include switching a polarity of a magnetic field of a stator coil of the brushless DC motor from a first polarity to a second polarity based on the coil switching signal, wherein the first predetermined threshold and the second predetermined threshold are selected such that when the polarity of the magnetic field of the stator coil is switched from the first polarity to the second polarity, a torque is generated by the magnetic field of the stator coil on a rotor of the brushless DC motor in a direction opposite to a direction of rotation of the rotor.

In some embodiments, a net torque generated by the magnetic field of the stator coil on the rotor is in the same direction as the direction of rotation of the rotor during a period of time when the magnetic field of the stator coil of the brushless DC motor is in the second polarity.

In some embodiments, the brushless DC motor is a single coil brushless DC motor.

In some embodiments, the sensor and the coil switching mechanism are packaged on a single chip.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1A:
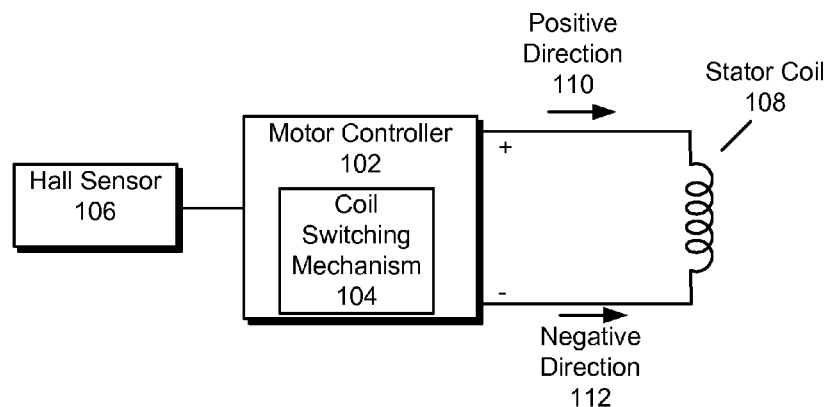
FIG. 1A shows a system for controlling a coil of a brushless DC motor in accordance with an embodiment.

FIG. 1A shows a system for controlling a coil of a brushless DC motor in accordance with an embodiment. Motor controller 102 includes coil switching mechanism 104, and receives input from Hall sensor 106. Motor controller 102 is coupled to stator coil 108 and can output current through stator coil 108 in positive direction 110 or negative direction 112.

Motor controller 102 and coil switching mechanism 104 can be implemented in any technology including but not limited to any combination of one or more of the following: an integrated circuit (IC), discrete circuits, any other semiconductor device, software running on a computer, a special purpose processor, a microcontroller, an ASIC, or one or more other dedicated or special purpose processors.

Hall sensor 106 is a Hall effect sensor and can be implemented in any technology without departing from the invention. In some embodiments, Hall sensor 106 can be replaced any other sensor that can detect a magnitude and polarity of the magnetic field of a rotor of a brushless DC motor without departing from the invention. Note that Hall sensor 106 and motor controller 102 can be implemented on one or more ICs without departing from the invention.

During operation, Hall sensor 106 detects the magnitude and polarity of the magnetic field of the rotor at the position of the stator coil. A signal related to the magnitude and polarity of the magnetic field is transmitted by Hall sensor 106 to motor controller 102. Coil switching mechanism 104 then controls motor controller 102 to output current through stator coil 108 in either positive direction 110 or negative direction 112 based on the magnitude and polarity of the magnetic field sensed by hall sensor 106 at two or more different times. This process is discussed in more detail below with respect to FIG. 1B.

Figure 1B:
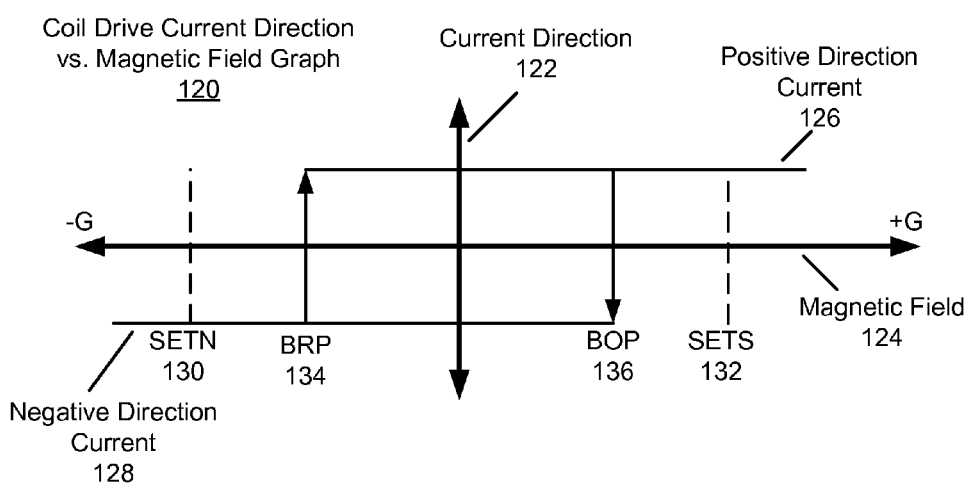
FIG. 1B shows an exemplary graph of the drive current direction for a coil in a brushless DC motor versus magnetic field sensed by a Hall sensor in accordance with an embodiment.

FIG. 1B shows an exemplary graph of the drive current direction for a coil in a brushless DC motor versus magnetic field sensed by a Hall sensor in accordance with an embodiment. In coil drive current direction vs. magnetic field graph 120, the horizontal axis represents magnetic field 124 detected by Hall sensor 106 with negative polarity (−G) to the left side of the graph and positive polarity (+G) to the right side of the graph. The vertical axis, current direction 122, represents the output current direction from motor controller 102 through stator coil 108. Horizontal line positive direction current 126 is an example of current output from motor controller 102 in positive direction 110, and horizontal line negative direction current 128 is an example of current output from motor controller 102 in negative direction 112. Additionally there are four magnetic field values marked on coil drive current direction vs. magnetic field graph 120: SETN 130, SETS 132, BRP 134, and BOP 136.

We will now describe the operation of coil switching mechanism 104 with reference to coil drive current direction vs. magnetic field graph 120. Note that for convenience the description starts from the state in which the initial magnetic field detected by Hall sensor 106 is below SETN 130 (i.e., larger in magnitude and the same polarity as SETN) and the current output by motor controller 102 is negative direction current 128. Any start state could be used without departing from the invention.

Starting from the state in which Hall sensor 106 detects a magnetic field less than SETN 130, when Hall sensor 106 then detects a magnetic field that is greater than BRP 134 (e.g., lower in magnitude with the same polarity as BRP 134), coil switching mechanism 104 controls motor controller 102 to switch the current through stator coil 108 from negative direction current 128 to positive direction current 126. Then, after Hall sensor 106 detects a magnetic field greater than SETS 132, coil switching mechanism 104 waits for a magnetic field less than BOP 136 to be detected. When a magnetic field less than BOP 136 is detected, coil switching mechanism 104 then controls motor controller 102 to switch the output current through stator coil 108 from positive direction current 126 to negative direction current 128. Then, when a magnetic field less than SETN 130 is detected, the cycle is complete. This cycle continues at the rotor of the brushless DC motor rotates.

Note that when coil switching mechanism 104 controls motor controller 102 to switch the direction of the current in stator coil 108 from negative direction current 128 to positive direction current 126 at magnetic field BRP 134, the polarity of the magnetic field from stator coil 108 is the same as the polarity of the magnetic field of the rotor as detected by Hall sensor 104. Therefore, stator coil 108 and the rotor will tend to repel each other, generating a torque on the rotor opposing the direction of rotation of the rotor. As the rotor continues rotating, the polarity of the magnetic field of the rotor at the position of stator coil 108 will eventually switch to a polarity opposite to that of stator coil 108. This will tend to generate a torque on the rotor in the direction of rotation of the rotor. Note that the net torque generated by the magnetic field of stator coil 108 on the rotor during the time that the current in stator coil 108 is positive direction current 126 is in the direction of rotation of the rotor.

A similar process occurs when the current direction changes from positive current direction 126 to negative current direction 128 at BOP 136. The polarity of the magnetic field generated by stator coil 108 is the same as that of the rotor and will therefore tend to exert a torque on the rotor in the direction opposite to its rotation. As the rotor continues rotating it will eventually rotate enough so that the polarity of the magnetic field from the rotor at stator coil 108 is opposite to the polarity of the magnetic field generated by stator coil 108. The torque generated by stator coil 108 on the rotor is then in the direction of rotation. Note that the net torque generated by the magnetic field of stator coil 108 on the rotor during the time that the current in stator coil 108 is negative direction current 128 is in the direction of rotation of the rotor.

Note that in some embodiments, the absolute value of BOP 136 and BRP 134 can be any value including but not limited to 10 gauss, 30 gauss, 50 gauss, or any value higher or lower without departing from the invention. Additionally, in some embodiments the magnitude of the difference in magnetic field between SETN 130 and BRP 134 is not equal to the magnitude of the difference in magnetic field between SETS 132 and BOP 136, as long as SETN 130 is less than BRP 134 and SETS 132 is larger than BOP 136. Furthermore, in some embodiments the values of parameters SETN 130, SETS 132, BRP 134, and BOP 136 are determined based on one or more operating characteristic of the brushless DC motor being driven by motor controller 102. For example, the values of one or more of these parameters may be selected to reduce audible noise generated by back emf current in stator coil 108, or to increase motor efficiency.

Additionally, note that the change in output current from positive direction current 126 to negative direction current 128 and vice-versa can be along any curve without departing from the present invention.

Note that some embodiments can be used with brushless DC motors that include any number of rotor poles and/or stator poles. Additionally, in brushless DC motors with multiple rotor poles, Hall sensor 106 can be located to detect the magnetic field of any position that is in phase with stator coil 108, or any position that is antiphased with stator coil 108 if the polarity of stator coil 108 or of the output current of motor controller 102 is reversed.

Figure 2:
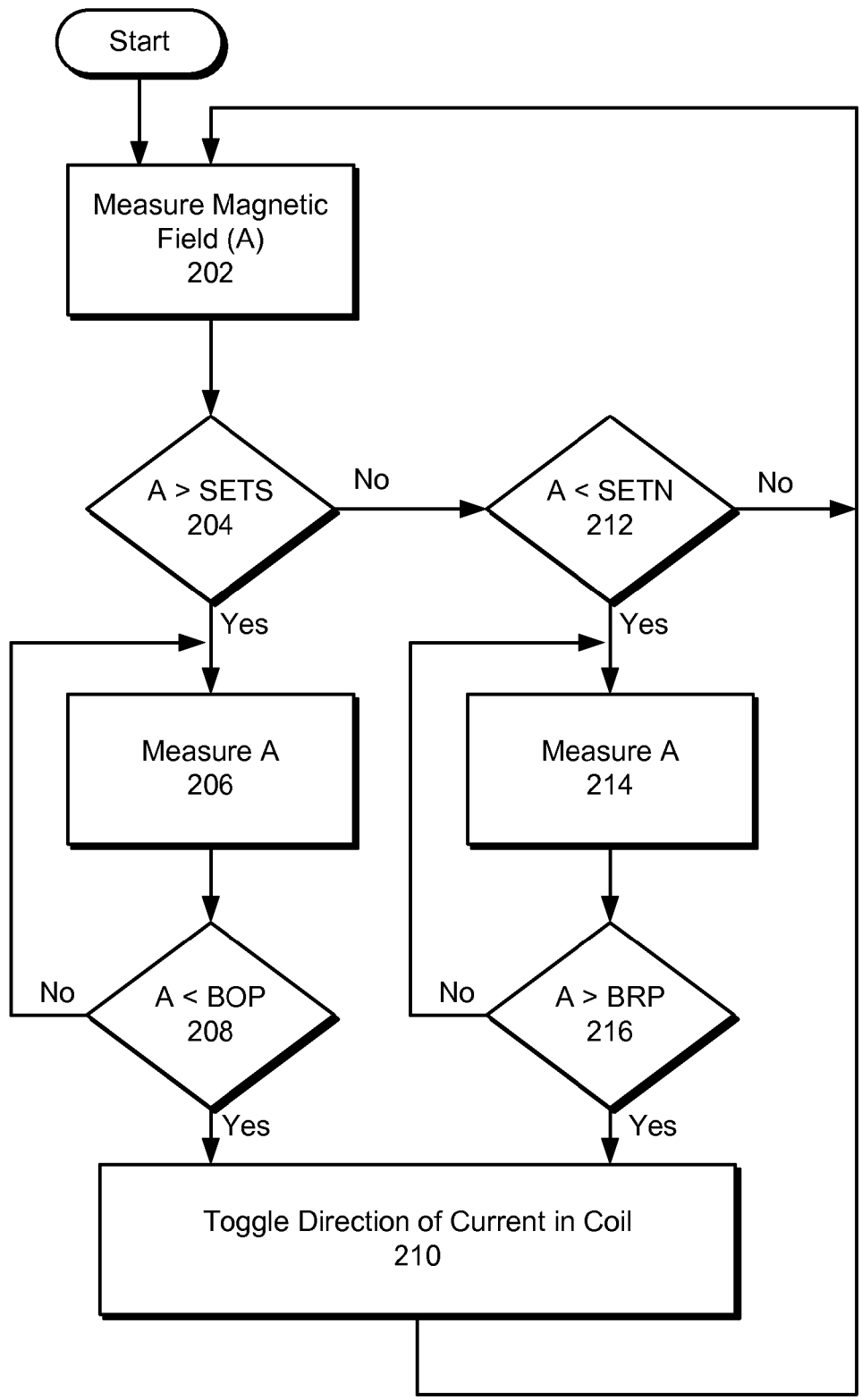
FIG. 2 shows a flowchart illustrating the process for generating a coil switching signal for a brushless DC motor in accordance with an embodiment.

FIG. 2 shows a flowchart illustrating the process for generating a coil switching signal for a brushless DC motor in accordance with an embodiment. First the magnetic field, A, of the rotor of the brushless DC motor is measured using a Hall effect sensor (step 202). If A is not greater than SETS (step 204), then the process proceeds to step 212. At step 212 if A is not less than SETN then the process returns to step 202. This loop will continue until either A is greater than SETS (steps 204) or A is less than SETN (step 212).

At step 204, if A is greater than SETS, then the magnetic field, A, is measured again (step 206). Then, if A is not less than BOP (step 208), the process returns to step 206 and continues in this loop until A is less than BOP (step 208) and the process proceeds to step 210. At step 210, the direction of the current in the stator coil is toggled (e.g., from positive current direction 126 to negative current direction 128). The process then returns to step 202.

The process will then loop from step 202 to step 204 and step 212 and back to step 202 until the rotor has rotated so that the magnetic field measured at step 202 is less than SETN. When A is less than SETN (step 212), the process continues to step 214 where A is measured again. At step 216, if A is not greater than BRP, then the process returns to step 214 and continues to loop until A is greater than BRP (step 216) and the process continues to step 210. In step 210, the direction of the current in the stator coil is toggled (e.g., from negative current direction 128 to positive current direction 126). The process then loops back to step 202.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for generating a coil switching signal for a brushless DC motor, comprising:
   determining a magnetic field of the brushless DC motor at a first time;
   determining the magnetic field of the brushless DC motor at a second time; and
   generating the coil switching signal based on a relationship between the magnetic field determined at the first time and a first predetermined threshold, and the magnetic field determined at the second time and a second predetermined threshold, wherein the first predetermined threshold has a first magnitude and the second predetermined threshold has a second magnitude.

2. The method of claim 1, wherein a magnitude of the first predetermined threshold is larger than a magnitude of the second predetermined threshold, and wherein a polarity of the first predetermined threshold is the same as a polarity of the second predetermined threshold.

3. The method of claim 2, wherein determining the magnetic field of the brushless DC motor includes:
   determining the magnetic field at the first time using a Hall effect sensor; and
   determining the magnetic field at the second time using the Hall effect sensor.

4. The method of claim 1, wherein the relationship between the magnetic field determined at the first time and the first predetermined threshold, and the magnetic field determined at the second time and the second predetermined threshold includes:
   a magnitude of the magnetic field determined at the first time being larger than or equal to a magnitude of the first predetermined threshold; and
   a magnitude of the magnetic field determined at the second time being less than or equal to a magnitude of the second predetermined threshold.

5. The method of claim 1, further including:
   switching a polarity of a magnetic field of a stator coil of the brushless DC motor from a first polarity to a second polarity based on the coil switching signal, wherein the first predetermined threshold and the second predetermined threshold are selected such that when the polarity of the magnetic field of the stator coil is switched from the first polarity to the second polarity a torque is generated by the magnetic field of the stator coil on a rotor of the brushless DC motor in a direction opposite to a direction of rotation of the rotor.

6. The method of claim 5, wherein a net torque generated by the magnetic field of the stator coil on the rotor is in the same direction as the direction of rotation of the rotor during a period of time when the magnetic field of the stator coil of the brushless DC motor is in the second polarity.

7. The method of claim 1, wherein the brushless DC motor is a single coil brushless DC motor.

8. A system for generating a coil switching signal for a brushless DC motor, comprising:
   a sensor configured to sense a magnetic field of the brushless DC motor; and
   a coil switching mechanism coupled to the sensor and configured to generate the coil switching signal based on a relationship between a first magnetic field value sensed by the sensor and a first predetermined threshold, and a second magnetic field value sensed by the sensor and a second predetermined threshold, wherein the first predetermined threshold has a first magnitude and the second predetermined threshold has a second magnitude.

9. The system of claim 8, wherein a magnitude of the first predetermined threshold is larger than a magnitude of the second predetermined threshold, and wherein a polarity of the first predetermined threshold is the same as a polarity of the second predetermined threshold.

10. The system of claim 9, wherein the relationship between the first magnetic field sensed by the sensor and the first predetermined threshold, and the second magnetic field sensed by the sensor and the second predetermined threshold includes:
    a magnitude of the first magnetic field sensed by the sensor being larger than or equal to a magnitude of the first predetermined threshold; and
    a magnitude of the second magnetic field sensed by the sensor being less than or equal to a magnitude of the second predetermined threshold.

11. The system of claim 10, wherein the sensor includes a Hall effect sensor.

12. The system of claim 11, further including:
    a rotor pole of a rotor of the brushless DC motor and a stator coil of the brushless DC motor, wherein the sensor is configured to sense a magnetic field of the rotor pole.

13. The system of claim 9, wherein the brushless DC motor is a single coil brushless DC motor.

14. The system of claim 10, wherein the sensor and the coil switching mechanism are packaged on a single chip.

15. A system for generating a coil switching signal for a brushless DC motor, comprising:
    a Hall effect sensor configured to sense a magnetic field of the brushless DC motor; and
    a coil switching mechanism coupled to the Hall sensor and configured to generate the coil switching signal based on a reduction in a magnitude of the magnetic field sensed by the Hall effect sensor from a first magnitude of a first predetermined threshold to a second magnitude of a second predetermined threshold.

16. The system of claim 15, wherein, the coil switching mechanism includes a magnetic field reduction sensing mechanism wherein the magnetic field reduction sensing mechanism is configured to sense a reduction in the magnetic field based a relationship between a first magnetic field value sensed by the Hall effect sensor and a first predetermined threshold and a second magnetic field value sensed by the Hall effect sensor and a second predetermined threshold.

17. The system of claim 16, wherein a magnitude of the first predetermined threshold is larger than a magnitude of the second predetermined threshold, and wherein a polarity of the first predetermined threshold is the same as a polarity of the second predetermined threshold.

18. The system of claim 17, wherein the relationship between the first magnetic field value sensed by the Hall effect sensor and the first predetermined threshold, and the second magnetic field value sensed by the Hall effect sensor and the second predetermined threshold includes:

a magnitude of the first magnetic field value sensed by the Hall effect sensor being larger than or equal to the magnitude of the first predetermined threshold; and a magnitude of the second magnetic field value sensed by the Hall effect sensor being less than or equal to the magnitude of the second predetermined threshold.

19. The system of claim 18, wherein the Hall effect sensor and the coil switching mechanism are packaged on a single chip.

20. The system of claim 19, wherein the brushless DC motor is a single coil brushless DC motor.

\* \* \* \* \*